UNITED STATES PATENT OFFICE.

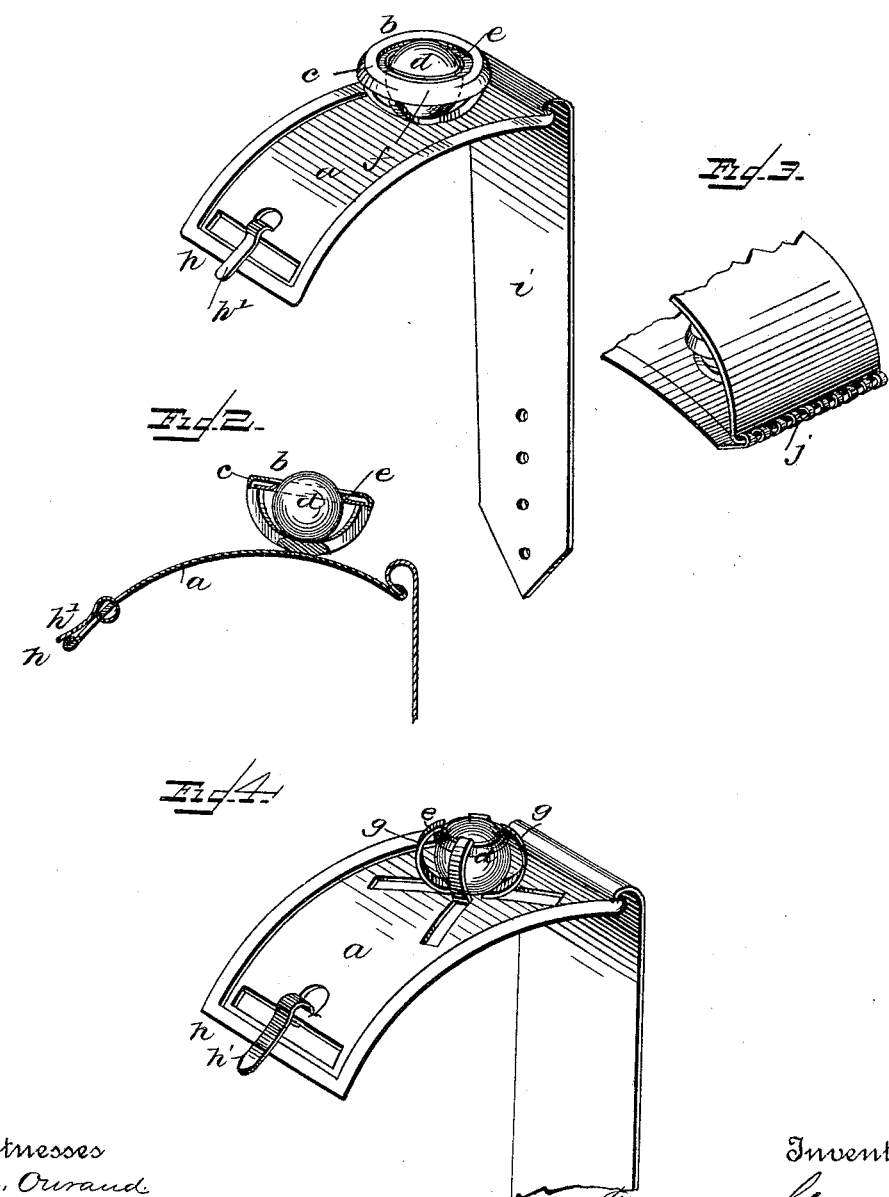

TILGHMAN GRAHAM, OF ALBANY, TEXAS.

PENMAN'S ARM-REST.

SPECIFICATION forming part of Letters Patent No. 364,917, dated June 14, 1887.

Application filed April 30, 1887. Serial No. 236,677. (No model.)

*To all whom it may concern:*

Be it known that I, TILGHMAN GRAHAM, a citizen of the United States, residing at Albany, in the county of Shackelford and State of Texas, have invented a certain new and useful Improvement in Penmen's Arm or Hand Rests, of which the following is a full, clear, and exact description.

This invention relates to wrist-rests for penmen's use.

The object of the invention is to provide a sort of swivel-pivot to support the wrist in writing, whereby perfect freedom of movement is given to the hand, and the position of the hand may be changed instantaneously without effort in forming characters in writing.

The invention consists of a flexible or pliable foundation-piece with an anti-friction or swivel roller or ball projecting from its surface and forming a pivot to support the wrist when writing, a strap or buckle, or other fastening, being used to attach the device to the wrist, all as I will now proceed to more particularly set forth and claim.

In the accompanying drawings, in the several figures of which like parts are similarly designated, Figure 1 is a perspective view; Fig. 2, a vertical longitudinal section; Fig. 3, a perspective view, on a larger scale, showing structural details for attaching the strap to the foundation-piece, and Fig. 4 is a perspective view showing an economical way of constructing the swivel.

The foundation-piece $a$ may be of any flexible or pliant material, having sufficient rigidity, however, to afford a firm support for the hand or wrist. This foundation-piece is provided with a swivel or pivot, $b$, consisting of a cage, $c$, inclosing a ball, $d$, with an intervening loose concave washer or bearing-plate, $e$, the said washer or bearing-plate permitting perfect freedom of self-adjustment of the ball within the cage. When the device is in use, the ball $d$ has its seat or bearing within the cage and upon that portion of it next the foundation-piece, and has perfect freedom of movement within said cage, the washer or bearing-plate $e$ interposing itself between the said ball and the mouth of the cage, so as to prevent the said ball from binding therein. It will be understood that the washer or bearing-plate $e$ is arranged loosely within the cage.

The cage $c$ may be made with an annular cup-shaped mouth-piece, $f$. In Figs. 1, 2, and 3 this cage $c$ is shown as an attachment to the foundation-piece; but in practice it will be most economical to strike up from the foundation-piece three or more arms, $g$, and bend over their ends, so as to overhang the washer or bearing-plate $e$, very much after the manner of a gem-setting for jewelry, it being understood, however, that these arms do not bear firmly upon the said washer or bearing-plate, as they do upon the gem in a gem-setting, but are simply turned over the periphery or outer edge of the washer or bearing-plate sufficiently far to prevent its escape from the said arms; or these arms $g$ may be provided with an annular cup-shaped mouth-piece, as at $f$ in Fig. 1. It will be observed that this pivotal device is very much of the construction and has practically the same operation as the common anti-friction caster for furniture, and to this extent any form of such anti-friction caster is adaptable to my purpose in this invention, and in this regard is within the scope of my invention.

One end of the foundation-piece $a$ is provided with a buckle or any other suitable fastening device, $h$. As shown in Figs. 1 and 2, this fastening device may be made practically integral with the foundation-piece. In the example shown the tongue $h'$ of the buckle is an attached portion.

The strap $i$ may be attached to the foundation-piece $a$ in any suitable manner. I prefer, however, to provide the end of the foundation-piece to which the strap is to be attached with points $j$, or other convenient device or devices for immediately engaging the strip and confining it to the foundation-piece, though, obviously, the strap might be sewed to the foundation-piece after passing through a loop, such as that shown at the opposite end to which said strap is shown as attached. I esteem it, however, of much importance to provide the foundation-piece $a$ itself with the necessary facilities for attaching the strap, and also for securing the strap when the device is applied to a writer's wrist, for in this way the device can be made with great economy. The side $a'$ of the foundation-piece is made smooth, so as to be applied without discomfort to the wrist, the said side coming next to the person when the device is in use. The foundation-piece is made sufficiently flexible or pliable to be bent to conform to the general outline of the wrist of the writer. That end of the device which contains the fastening h is arranged next to the radius of the arm, so as to throw the swivel over toward the ulna, and thus support the hand in the natural position that it assumes in writing.

Of the fastening device shown in the drawings it may be said that the points j may be turned over and forced through the end of the strap to attach it to the foundation-piece. It will be observed that in the drawings I have shown the device in reverse position to what it will be in use; but obviously this is the most convenient manner of illustrating the construction.

The ball d may be a glass or other marble.

What I claim is—

1. A penman's arm-rest composed of a foundation-piece, a swivel or anti-friction pivot, and means for securing it to a writer's wrist, substantially as described.

2. A foundation-piece, a swivel or anti-friction pivot applied thereto, and a strap and fastening device for applying the device to a writer's wrist, substantially as described; forming a penman's arm or hand rest.

3. A flexible or pliable foundation-piece, combined with an anti-friction or swiveled pivotal device, and means for fastening the same to a writer's wrist, substantially as described.

4. A foundation-piece, a strap, devices integral with the foundation-piece for connecting the strap to it, and a fastening device, combined with an anti-friction or swivel pivot, substantially as described.

5. A foundation-piece provided with an anti-friction pivot or swivel, a strap, devices integral with the foundation-piece for connecting the strap to the same, and a buckle, the loop of which is integral with the foundation-piece, substantially as described.

6. A penman's arm or hand rest having a foundation-piece provided with a ball, d, surrounded by washer e, and connected to the foundation piece by arms struck up from the metal of the foundation-piece, substantially as described.

In testimony whereof I have hereunto set my hand this 30th day of April, A. D. 1887.

TILGHMAN GRAHAM.

Witnesses:
EDWIN A. FINCKEL,
PHILIP MAURO.